United States Patent
Zeng et al.

(10) Patent No.: US 8,045,804 B2
(45) Date of Patent: Oct. 25, 2011

(54) METHOD AND APPARATUS FOR ESTIMATING VANISH POINTS FROM AN IMAGE, COMPUTER PROGRAM AND STORAGE MEDIUM THEREOF

(75) Inventors: Xu Zeng, Beijing (CN); Lifeng Xu, Beijing (CN); Qilin Xiao, Beijing (CN)

(73) Assignee: Canon Kabushiki Kaisha, Tokyo (JP)

( * ) Notice: Subject to any disclaimer, the term of this patent is extended or adjusted under 35 U.S.C. 154(b) by 884 days.

(21) Appl. No.: 11/946,105

(22) Filed: Nov. 28, 2007

(65) Prior Publication Data
US 2008/0260256 A1    Oct. 23, 2008

(30) Foreign Application Priority Data
Nov. 29, 2006   (CN) .......................... 2006 1 0163163

(51) Int. Cl.
G06K 9/00 (2006.01)
G09B 11/00 (2006.01)
B43L 13/14 (2006.01)

(52) U.S. Cl. ........................ 382/188; 432/85; 33/432

(58) Field of Classification Search .................. 382/173, 382/199, 275, 284, 312, 314, 188, 195; 434/85, 434/90; 33/228, 432
See application file for complete search history.

(56) References Cited

U.S. PATENT DOCUMENTS

| | | | | |
|---|---|---|---|---|
| 6,873,732 | B2* | 3/2005 | Dance | 382/199 |
| 7,088,440 | B2* | 8/2006 | Buermann et al. | 356/138 |
| 7,106,898 | B2* | 9/2006 | Bouguet et al. | 382/154 |
| 7,203,384 | B2* | 4/2007 | Carl | 382/314 |

* cited by examiner

*Primary Examiner* — Kanjibhai Patel
(74) *Attorney, Agent, or Firm* — Fitzpatrick, Cella, Harper & Scinto

(57) ABSTRACT

A method and apparatus for estimating vanishing points from an image, a computer program and a storage medium thereof are provided. One of the methods for detecting the vanishing points from an image includes a dividing step for dividing the image into small patches, a first detecting step for detecting each patch's local orientations, a composing step for composing lines of pencils from which at least one vanishing point is to be computed based on the local orientations detected in the first detecting step, and a computing step for computing at least one vanishing point based on the lines of pencils composed in the composing step. On the basis of the computed vanishing points, the perspective rectification on a document image can be executed accurately and quickly.

8 Claims, 17 Drawing Sheets

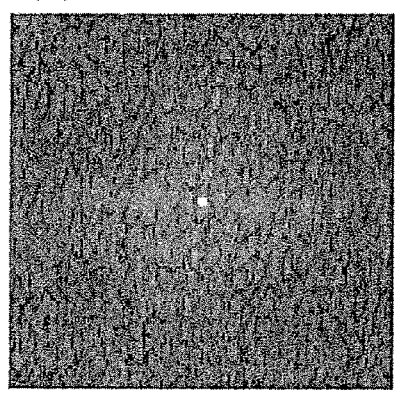
(A) TEXTURE PATCH
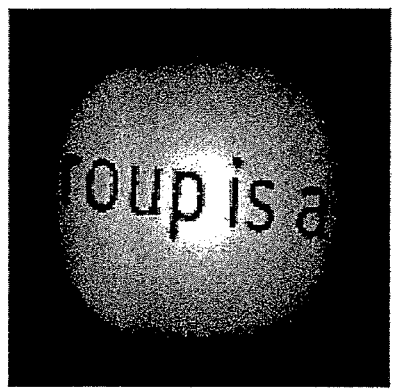
(B) HANNING FILTERED PATCH
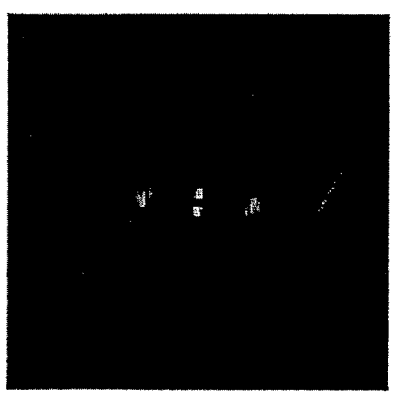
(C) HANNING FILTERED SPECTRA
(D) PRUNED HANNING FILTERED SPECTRA
FIGURE 4
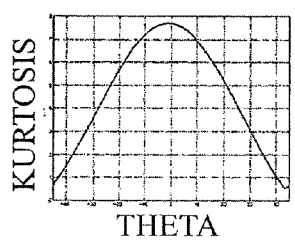
(A) 2-D ICA ILLUSTRATION
(B) SPECTRA ORIENTATION
(C) TEXTURE ORIENTATION
FIGURE 5

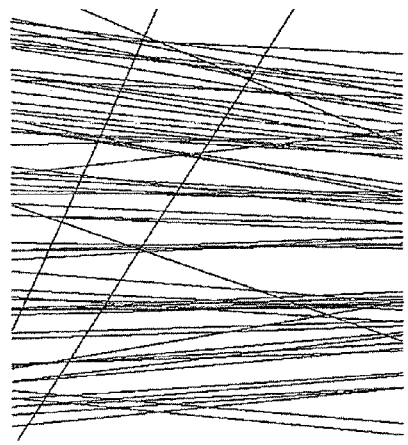
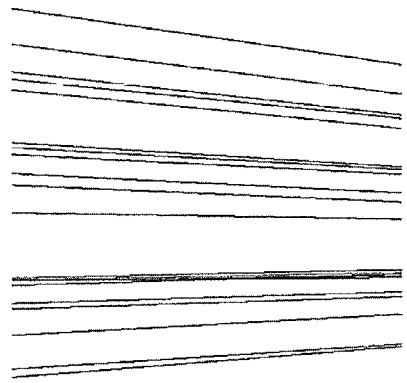
(A) ORIGINAL PENCIL
(NON PARALLEL SITUATION)
(B) PRUNED PENCIL
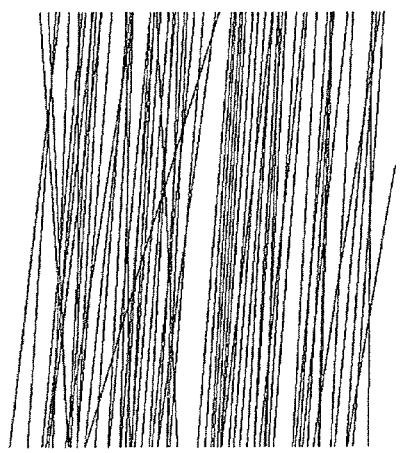
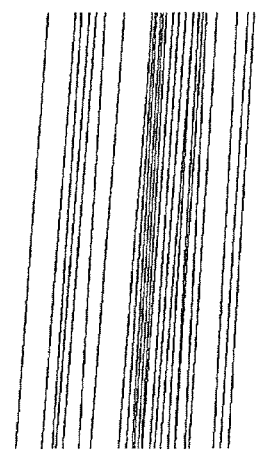
(C) ORIGINAL PENCIL
(PARALLEL SITUATION)
(D) PRUNED PENCIL
FIGURE 7

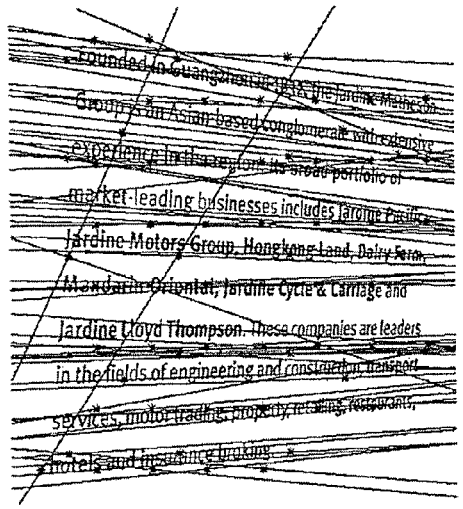
(A) ORIGINAL LOCAL
HORIZONTAL PENCIL
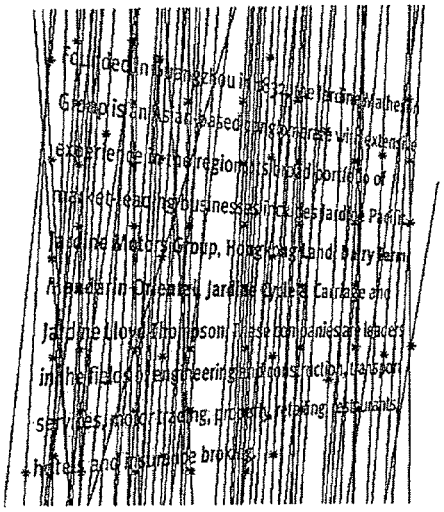
(B) ORIGINAL LOCAL
VERTICAL PENCIL
(C) ORIGINAL IMAGE
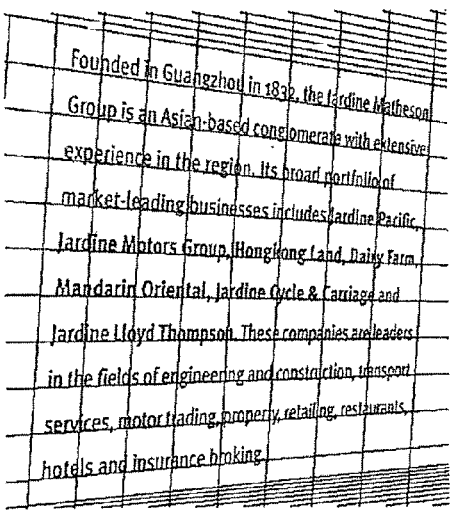
(D) IMAGE WITH
VANISHING POINTS LABELED
FIGURE 8

$$\tan \alpha = \frac{1}{N} \tan \alpha_H$$

~~~~~~ businesses includes Jardine Pacific, Jardine Motors Group, Hongkong Land, Dairy Farm, Mandarin Oriental, Jardine Cycle & Carriage and Jardine Lloyd Thompson. These companies are leaders in the fields of engineering and construction, transport services, motor trading, property, retailing, restaurants, hotels and insurance broking.

...businesses includes Jardine Pacific, Jardine Motors Group, Hongkong Land, Dairy Farm, Mandarin Oriental, Jardine Cycle & Carriage and Jardine Lloyd Thompson. These companies are leaders in the fields of engineering and construction, transport services, motor trading, property, retailing, restaurants, hotels and insurance broking.

FIGURE 20

...businesses includes Jardine Pacific, Jardine Motors Group, Hongkong Land, Dairy Farm Mandarin Oriental, Jardine Cycle & Carriage and Jardine Lloyd Thompson. These companies are leaders in the fields of engineering and construction, transport services, motor trading, property, retailing, restaurants, hotels and insurance broking.

FIGURE 21

...ng businesses includes Jardine Pacific, Jardine Motors Group, Hongkong Land, Dairy Farm, Mandarin Oriental, Jardine Cycle & Carriage and Jardine Lloyd Thompson. These companies are leaders in the fields of engineering and construction, transport services, motor trading, property, retailing, restaurants, hotels and insurance broking.

```
     DOCUMENT PAGE
            ↓
  SHOOT BY DIGITAL CAMERA        ——— 2601
            ↓
  CORRECT PERSPECTIVE DISTORTION ——— 2602
            ↓
   FIND TEXT COMPONENT           ——— 2603
            ↓
          OCR                    ——— 2604
            ↓
          TEXT                   ——— 2605
```

METHOD AND APPARATUS FOR ESTIMATING VANISH POINTS FROM AN IMAGE, COMPUTER PROGRAM AND STORAGE MEDIUM THEREOF

FIELD OF THE INVENTION

The present invention relates, in general, to a method for auto perspective rectification. More particularly, the present invention relates to a method and apparatus for estimating vanishing points from an image (e.g. a document image), a computer program and a storage medium thereof.

BACKGROUND OF THE INVENTION

Document scanners are widely used to capture text and transform it into electronic form for further processing. As camera resolution has risen in recent years, text capture through digital cameras is becoming an alternative choice. Digital cameras are portable and offer face-up, non-contact, near-instantaneous image acquisition, but suffer from image quality problems resulting from the wide range of conditions in which they may operate. One of the most severe problems is that the cameras shoot documents with arbitrary perspectives and bring perspective distortions to captured images. The presence of perspective is distracting to human readers and makes image-analysis operations, such as optical character recognition (OCR), layout analysis and compression, slower and less reliable.

Thus, it is desirable to automatically correct the perspective-distorted image to produce an upright view of the text regions for an image.

Although the geometry of rectification is fairly mature, such as those methods proposed by R. M. Haralick in "Monocular vision using inverse perspective projection geometry: analytic relations", Proceedings of the IEEE Computer Vision and Pattern Recognition Conference 1989; 370-378, few rectification techniques have been reported in the literature for perspective-distorted document images through digital cameras. In the article "Recognizing text in real scenes, International Journal of Document Analysis and Recognition" 4 (4) (2002) 243-257, by P. Clark and M. Mirmehdi, the quadrilaterals formed by the borders between the background and plane where text lines are utilized to get an upright view of perspective-distorted text. After the extraction of quadrilaterals using the perceptual grouping method, a bilinear interpolation operation is implemented to construct the corrected document image. As the algorithm depends heavily on the extraction of quadrilaterals, the existence of a high-contrast document border (HDB) within the captured document image is a must for correct rectification.

Instead of using document borders that do not always exist in a real scene, M. Pilu has proposed a new rectification approach in the article "Extraction of illusory linear clues in perspectively skewed documents," Proceedings of the IEEE Computer Vision and Pattern Recognition Conference 2001; 363-368 based on the extraction of illusory clues. To extract the horizontal clues, the character or group of characters is transformed into a blob first and a pairwise saliency measure is computed for pairs of neighboring blobs, which indicates how likely they belong to one text line. After that, a network based on perceptual organization principles is transversed over the text and horizontal clues are calculated as the salient linear groups of blobs. Though working well on the extraction of horizontal clues, the method cannot extract enough vertical information.

In the article "Perspective estimation for document images," Proceedings of the SPIE Conference on Document Recognition and Retrieval IX 2002; 244-254 by C. R. Dance, a distorted document image is rectified using two principal vanishing points, which are estimated based on the parallel lines extracted from the text lines and the vertical paragraph margins (VPM). The main drawback of this approach is that it works only on a fully aligned text, as it relies heavily on the existence of VPM features. In addition, the means to extract parallel lines also is not clarified.

In the article "Rectifying perspective views of text in 3D scenes using vanishing points," Pattern Recognition 36 (2003) 2673-2686 by P. Clark and M. Mirmhedi, two vanishing points are estimated based on some paragraph formatting (PF) information. More specifically, the horizontal vanishing point is calculated based on a novel extension of a 2D projection profile and the vertical vanishing point based on some PF information, such as VPM or a text line spacing variation, when paragraphs are not fully aligned. However, to implement such a rectification method, well-formatted paragraphs are required.

Nowadays, several applications that can rectify the perspective distorted document image have been brought on the market, for example, Casio EX-Z55 and Wintone Huishi. However, both of them are based on HDB extraction, and the results are not reliable due to the lack of sufficient border information.

SUMMARY OF THE INVENTION

In view of the above situation, the object of the present invention is to automatically correct a perspective distorted image to produce an upright view of the text regions.

To achieve the above stated objects, according to an aspect of the present invention, there is provided a method for detecting the vanishing points from an image, comprising: a dividing step for dividing the image into small patches; a first detecting step for detecting each patch's local orientations; a composing step for composing lines of pencils based on the local orientations detected in the first detecting step; and a first computing step for computing at least one vanishing point based on the lines of pencils composed in said composing step.

To achieve the above stated objects, according to an aspect of the present invention, there is provided another method for detecting the vanishing points from an image, comprising: a second detecting step for detecting an edge of the image and forming an edge image; an extracting step for extracting the text baseline from the edge image and forming a text baseline image; and a finding step for finding the horizontal vanishing point from the text baseline image.

According to one preferred embodiment, a vertical vanishing point is further located on the basis of the horizontal vanishing point obtained by the above stated method.

Furthermore, a method for perspective rectification in a document image is provided on the basis of the above obtained vanishing points.

To achieve the above stated objects, according to another aspect of the present invention, there is provided an apparatus for detecting the vanishing points from an image, comprising: dividing means for dividing the image into small patches; first detecting means for detecting each patch's local orientations; composing means for composing lines of pencils based on the local orientations detected by the first detecting means; and a first computing means for computing at least one vanishing point based on the lines of pencils composed by the composing means.

To achieve the above stated objects, according to another aspect of the present invention, there is provided another apparatus for detecting the vanishing points from an image, comprising: second detecting means for detecting an edge of the image and forming an edge image; extracting means for extracting the text baseline from the edge image and forming a text baseline image; and finding means for finding the horizontal vanishing point from the text baseline image.

According to one preferred embodiment, a vertical vanishing point is further located on the basis of the horizontal vanishing point obtained by the above stated apparatus.

Furthermore, an apparatus for perspective rectification in a document image is provided on the basis of the above obtained vanishing points.

A computer program for implementing the above discussed method of extracting text from document image with a complex background is also provided.

In addition, computer program products in at least one computer-readable medium comprising program codes for implementing the method of extracting text from document image with a complex background are also provided.

In can be seen that different from the above mentioned methods which depend heavily upon document borders (DB) or the paragraph format (PF), the present invention detects the vanishing point from a local spectra's orientation information of textural area and edge information of characters. The rectification matrix can then be derived from the detected vanishing points. Neither document borders, nor paragraph format information is needed. The algorithm according to the present invention can handle document images with figures and graphics as well, such as mathematical equations.

Other objects, features and advantages of the present invention will be apparent from the following description when taken in conjunction with the accompanying drawings, in which like reference characters designate the same or similar parts throughout the drawings thereof.

BRIEF DESCRIPTION OF THE DRAWINGS

The accompanying drawings, which are incorporated in and constitute a part of the specification, illustrate embodiments of the invention and, together with the description, serve to explain the principles of the invention. In the drawings:

FIG. 4a shows one of the exemplary texture patch taken from the original image;

FIG. 4b shows the result after spectra filtering on the texture patch shown in FIG. 4a;

FIG. 4c shows the result of computing the filtered patch's spectra shown in FIG. 4b by FFT;

FIG. 4d shows the pruning result on the filtered spectra shown in FIG. 4c;

FIG. 5a shows a two-dimension independent component analysis illustration;

FIG. 5b shows the spectra orientation result by using the two-dimension independent component analysis shown in FIG. 5a;

FIG. 5c shows the texture orientation result by using the two-dimension independent component analysis shown in FIG. 5a;

FIG. 7a shows the original pencil for a non parallel situation;

FIG. 7b shows the pruned pencil with respect to the original pencil for a non-parallel situation shown in FIG. 7a according to the first embodiment of the present invention;

FIG. 7c shows the original pencil for a parallel situation;

FIG. 7d shows the pruned pencil with respect to the original pencil for the parallel situation shown in FIG. 7c according to the first embodiment of the present invention;

FIG. 8 illustrates an example for vanishing point estimation in a text-containing document image, wherein FIG. 8a shows the original local horizontal pencil and FIG. 8b shows the original local vertical pencil, FIG. 8c shows the original image and FIG. 8d shows the image with vanishing points labeled;

FIG. 18 shows the relationships between the parameters for locating the vertical vanishing points according to the second embodiment of the present invention;

FIG. 19 to FIG. 25 give the results of perspective rectification by applying the proposed method according to the second embodiment, wherein FIG. 19 shows a perspective distorted image, FIG. 20 illustrates the detected horizontal vanishing point HVP and all the horizontal lines are derived from the same point, i.e., the HVP, FIG. 21 shows an image block cropped from the edge image before removing edges that do not belong to the vertical strokes, FIG. 22 shows an image block cropped from the edge image after removing the edges that do not belong to the vertical strokes, FIG. 23 shows the detected line segments (vertical strokes), FIG. 24 illustrates the detected horizontal vanishing point HVP and the vertical vanishing point VVP and all the horizontal lines are derived from the HVP and all the vertical lines are derived from the VVP, and FIG. 25 shows the perspective rectified image according to the second embodiment of the present invention; and FIG. 26 shows a document entry system for a digital camera to which the method for detecting the vanishing points from a document image according to the first and second embodiment of the present invention can be applied.

DETAILED DESCRIPTION OF THE PREFERRED EMBODIMENT

In the following detailed description, numerous specific details are set forth in order to provide a thorough understanding of the invention. However, it will be appreciated by one of ordinary skill in the art that the present invention shall not be limited to these specific details.

First, an example of the computer system that can implement the present invention will be described with reference to FIG. 1.

The method of the invention may be implemented in any image processing device, for example, a personal computer (PC), a notebook, or a single-chip microcomputer (SCM) embedded in a camera, a video camera, a scanner, and etc. To a person skilled in the art, it would be easy to realize the method of the invention through software, hardware and/or firmware. It should be particularly noted that, to implement any step of the method or any combination of the steps, or any combination of the components, it is obvious for a person skilled in the art that it may be necessary to use an I/O device, a memory device, a microprocessor such as a CPU, and the like. The following descriptions and the method of the present invention will not necessarily mention such devices, although they are actually used.

As the image processing device mentioned above, the block diagram illustrated in FIG. 1 shows one example of a typical computer system, which may be used with the present invention. Note that while FIG. 1 illustrates various components of a computer system, it is not intended to represent any particular architecture or manner of interconnecting the components, as such details are not germane to the present invention. It will also be appreciated that network computers and other data processing systems, which have fewer components or perhaps more components, may also be used with the present invention.

Figure 1:
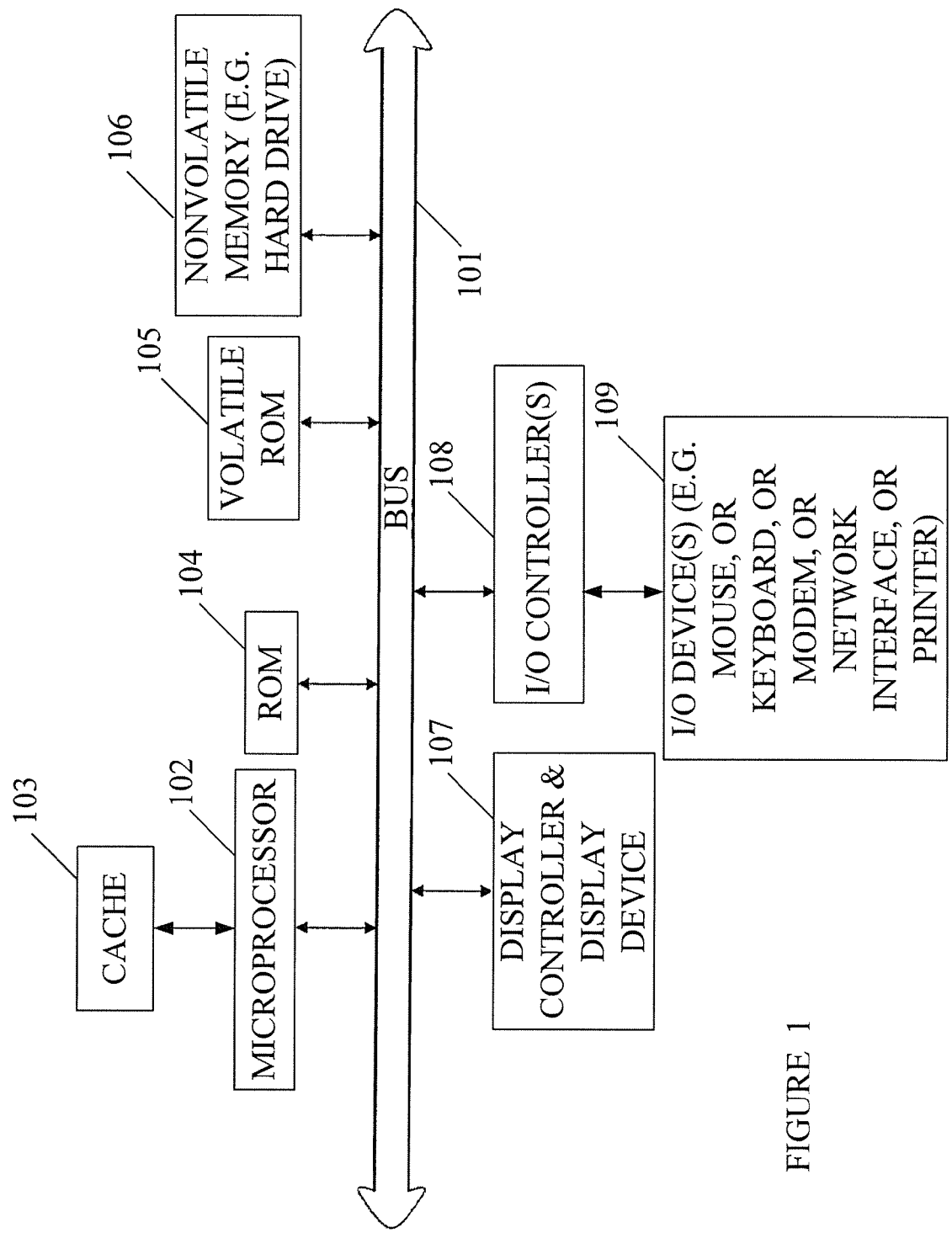
FIG. 1 shows the block diagram of a computer system, which may to be used with the present invention.

As shown in FIG. 1, the computer system, which is a form of a data processing system, includes a bus 101 that is coupled to a microprocessor 102, a ROM 104, a volatile RAM 105, and a non-volatile memory 106. The microprocessor 102, which may be a Pentium microprocessor from Intel Corporation, is coupled to cache memory 103 as shown in the example of FIG. 1. The bus 101 interconnects these various components together, and also interconnects these components 103, 104, 105, and 106 to a display controller and a display device 107 and to peripheral devices such as input/output (I/O) devices, which may be a mouse, keyboards, modems, network interfaces, printers, and other devices that are well known in the art. Typically, the input/output devices 109 are coupled to the system through input/output controllers 108. The volatile RAM 105 is typically implemented as dynamic RAM (DRAM), which requires power continuously in order to refresh or maintain the data in the memory. The non-volatile memory 106 is typically a magnetic hard drive or a magnetic optical drive or an optical drive or a DVD RAM or other type of memory system, which maintains data even after the power is removed from the system. Typically, the non-volatile memory will also be a random access memory, although this is not required. While FIG. 1 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 101 may include one or more buses connected to each other through various bridges, controllers, and/or adapters, as is well known in the art. In one embodiment, the I/O controller 108 includes a USB (Universal Serial Bus) adapter for controlling USB peripherals.

Next, the embodiments of methods for estimating vanishing points from a document image according to the present invention will be to explained in detail by referring to the accompanying drawings.

Before illustrating the concrete embodiments of the present invention, the technical terms used in the present invention will be briefly summarized in the following table.

| | |
|---|---|
| ICA | Independent Component Analysis |
| FFT | Fast Fourier Transform |
| DC | Direct Current |
| Pencil | The set of all lines through a point. For detailed information, please refer to the following web page on http://mathworld.wolfram.com/Pencil.html |
| Pencil prune | Delete the worst line in a pencil one by one according to lines' quality until the pencil quality is good enough |
| Pencil analysis | Find the vanishing point of a pencil. |
| Vanishing point | Vanishing point is defined as the convergence point of lines in an image plane that is produced by the projection of parallel lines in real space. For detailed information, please refer to the following web page on http://mathworld.wolfram.com/VanishingPoint.html |
| HVP | In the embodiments described in the present invention, horizontal vanishing point (HVP) is the convergence point of horizontal lines (for example, text base lines). |
| VVP | In the embodiments described in the present invention, vertical vanishing point (VVP) is the convergence point of vertical lines (for example, vertical strokes, justified paragraph borders). |
| "OR" compression | "OR" means that for the N to 1 mapping from original image to compressed image, if there's at least a black pixel in the N pixels, then the pixel on the compressed image is set as black. |
| Text Baseline | The text baseline is a continuous or discontinuous line constituted by the base line (for example, European languages) or bottom line for example, East Asian languages) of each character in the compressed image. |
| Rectification matrix | According to the geometry of rectification method proposed by R.M. Haralick in "Monocular vision using inverse perspective projection geometry: analytic relations, Proceedings of the IEEE Computer Vision and Pattern Recognition Conference 1989; 370-378", a 3*3 rectification matrix can be derived from the HVP and VVP. It is the inverse of the distortion matrix. By using the rectification matrix, an up-right view can be easily recovered from the distorted image. |

Now the present invention will be described in connection with the accompanying drawings by adopting the above defined technical terms. Please be noted that the related technical term mentioned in the following description and the claims will be generally explain as the meanings defined in the above table, unless otherwise being specially explained.

First Embodiment

Figure 2:
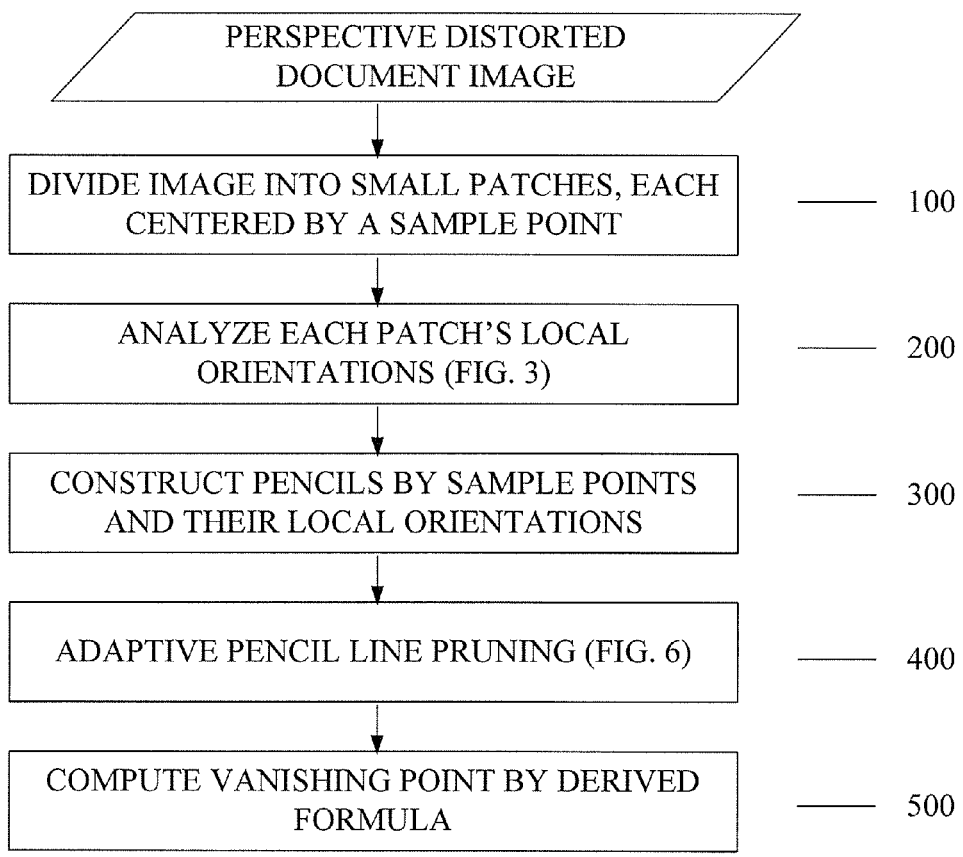
FIG. 2 shows the flow chart for detecting the vanishing points from a document image according to the first embodiment of the present invention.

FIG. 2 shows the flow chart of the method for detecting the vanishing points from a document image according to the first embodiment of the present invention.

As shown in FIG. 2, first at step 100, set some sample points in the original image, for example, evenly select 8×8 points. Each sample point is associated with a template size of a small patch (small area), such as 64, 128 or 256, which should be appropriate for FFT (Fast Fourier Transform). After the process in step 100, the original image is divided to into some small patches (i.e., some small areas are extracted from the original image), and each patch is centered by one of the sample points.

Then, in step 200, each patch's local orientations are analyzed. It is hard to analyze a texture patch's orientations directly. Generally they are estimated by spectra. The present invention is also based on this idea, but the method is to analyze spectra by ICA (Independent Component Analysis). Step 200 consists of four sub-procedures as illustrated in FIG. 3.

Figure 3:
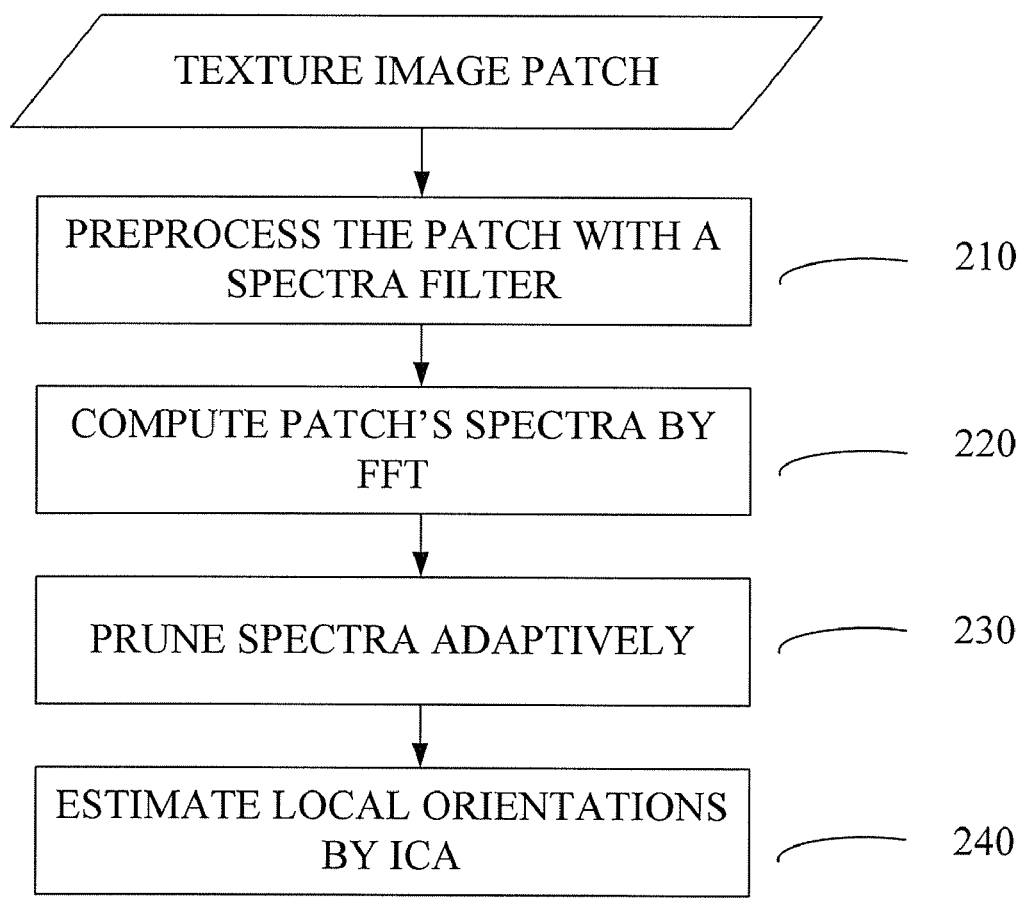
FIG. 3 is a flow chart showing the method for analyzing the local orientation of each patch in the original image.

FIG. 3 is a flow chart showing the method for analyzing the local orientation of each patch in the original image. It should be noted that the following description is directed to the exemplary texture patch taken from the original image shown in FIG. 4a.

As shown in FIG. 3, in step 210 a spectra filter (for example, Hanning filter) is used to preprocess the image patch as shown in FIG. 4a by convolution so as to obtain a smooth spectral response. The preprocess result of the spectra filter is illustrated in FIG. 4b. FIG. 4b shows the result after spectra filtering on the texture patch shown in FIG. 4a.

Then, in step 220, the filtered patch's spectra shown in FIG. 4b is computed by an FFT, and shifted to a symmetrical one. The computing result is illustrated in FIG. 4c. FIG. 4c shows the result of computing the filtered patch's spectra shown in FIG. 4b by FFT.

Since it is cumbersome to analyze original spectra directly, the present invention hereby prunes the spectra for optimization while keeping the original spectra's structural information. In step 230, the spectra is pruned by reserving only the first n (e.g., n=template size) largest spectra components. It should be noted that the DC (Direct Current) component is also deleted. The result is illustrated in FIG. 4d. FIG. 4d shows the pruning result on the filtered spectra shown in FIG. 4c.

Thereafter, the pruned spectra are analyzed by the ICA algorithm of the present invention in Step 240.

Generally speaking, the ICA algorithm according to the present invention consists of three steps: 1) centering, 2) whitening, 3) maximizing an objective function.

For a spectra image X, each point on the spectra image has two coordinates x and y, and the spectra value for each point is defined as that sample point's probability p. $C_x$ is the covariance of X. Here, the central point is defined as the origin for centering.

The whitening operation searches for a transformation V, such that s.t. Y=VX is white. That is, to make the Y's covariance as an identity matrix. Here $$V = \Lambda^{\frac{1}{2}} \Theta^T. \quad (1)$$

where $\Lambda$ represents eigenvalues of $C_x$ (diag), and $\Theta$ represents eigenvectors of $C_x$ in columns.

For the two-dimension situation, ICA is simplified to a rotation variable R, i.e., only one variable, such that the PDF (Probability Distribution Function) of output S=RY is as different as possible from the Gaussian function. Here:

$$R = \begin{bmatrix} \cos\theta & -\sin\theta \\ \sin\theta & \cos\theta \end{bmatrix}, \quad (2)$$

where $\theta \in [-45°, 45°]$.

A $\theta$ is searched such that the non-Gaussian value is maximum. The most commonly used non-Gaussian criterion is Kurtosis, which is defined as:

$$\kappa(x) = E[X^4] - 3(E[X^2])^2. \quad (3)$$

Kurtosis is zero for a Gaussian random variable, and thus the $\theta$ corresponding to the maximum absolute Kurtosis value is searched. An example is illustrated in FIG. 5a.

The observed signals are X=AS, and thus:

$$A = (RV)^{-1}, \quad (4)$$

where A's column vectors represent two independent orientations, as illustrated in FIG. 5b. FIG. 5b shows the spectra orientation result by using the two-dimension independent component analysis shown in FIG. 5a. It should be noted that spectra's orientations are orthogonal to original patch's orientations. The results are illustrated in FIG. 5c. FIG. 5c shows the texture orientation result by using the two dimension independent component analysis shown in FIG. 5a.

In addition, it should be noted that the above described step 200 also implicitly uses a partial ICA algorithm, as illustrated below.

Equation (4) can compute two local independent orientations synchronously. In some situations, one orientation is known in advance; then the Equation (4) can be used to compute another orientation by searching $\theta$, such that the difference between the orientation known in advance and one of the computed orientation is a minimum. As a result, another orientation can be obtained. This method is very fast only if one orientation is known in advance.

Now, returning to FIG. 2, after analyzing the local orientations of each patch with the above stated method, the process advances to step 300, in which sets of lines, called pencils, are constructed by the sample points and local orientations of the patches. Each pencil is a set of lines from which a vanishing point is to be computed. A vanishing point is a point through which each line of the pencil passes. The procedure for determining the vanishing point of the pencils is discussed below.

Since each patch has two orientations, they can be easily classified by their slopes. Accordingly, two lines can be drawn for each patch by their local orientations and their associated sample points. These lines are represented as r=x cos $\theta$+y sin $\theta$. All these lines can be simply categorized as being "vertical" or "horizontal". Each group of lines is supposed to intersect at one vanishing point, thus forming a pencil.

Thereafter, the process advances to step 400 to perform an adaptive pencil line pruning process (adaptive pencil line deletion process).

Since pencil lines are estimated in a real situation, some noisy lines may be included in a pencil. Some noisy lines of the pencil should be pruned (deleted) for better results. Step 400 prunes these noisy lines adaptively and the details are explained as follows.

If three lines $(r_i, \theta_i)$, $(r_j, \theta_j)$, $(r_k, \theta_k)$ are parallel or intersect at one point, there exists following relationship:

$$r_i \sin(\theta_j - \theta_k) + r_j \sin(\theta_k - \theta_i) + r_k \sin(\theta_i - \theta_j) = 0. \quad (5)$$

This formula is very simple and easy to prove, just by definition. Thus the method to prune noisy lines adaptively according to the present invention is based on this formula.

For each line $(r_i, \theta_i)$ in a pencil, a line quality is defined by the following equation:

$$LineQ_i = \sum_{j,k} |r_i \sin(\theta_j - \theta_k) + r_j \sin(\theta_k - \theta_i) + r_k \sin(\theta_i - \theta_j)|. \quad (6)$$

Smaller $LineQ_i$ means better line quality.
In addition, a pencil's quality is defined as:

$$PencilQ = \frac{\sum_i LineQ_i}{N|r_0|}, \quad (7)$$

where N is the pencil lines amount, $r_0$ belongs to the line with minimum LineQ, and it is used here for normalization. PencilQ's value is meaningful only if it is normalized as in Equation (7). Equation (7) can be seen as an intrinsic metric for pencils, since it is computed irrespective of the coordinate origin, translation, scale and rotation.

PencilQ should be very small for any good pencil. After setting a good pencil's quality threshold as $PencilQ_{Th}$ (for example, $PencilQ_{Th}=0.5$), a pencil's quality can be computed. If it is bigger than $PencilQ_{Th}$, delete the worst line (N=N−1) which has the maximum LineQ, and recalculate the pencil's quality, until it is less than $PencilQ_{Th}$. FIGS. 5a-5d illustrate this process. In a real situation, a pencil may have two states, parallel or non parallel. Both can be first pruned by above procedure. After the pencil quality is made sufficiently high, the parallel situation can be easily differentiated, such as by angles variances.

Figure 6:
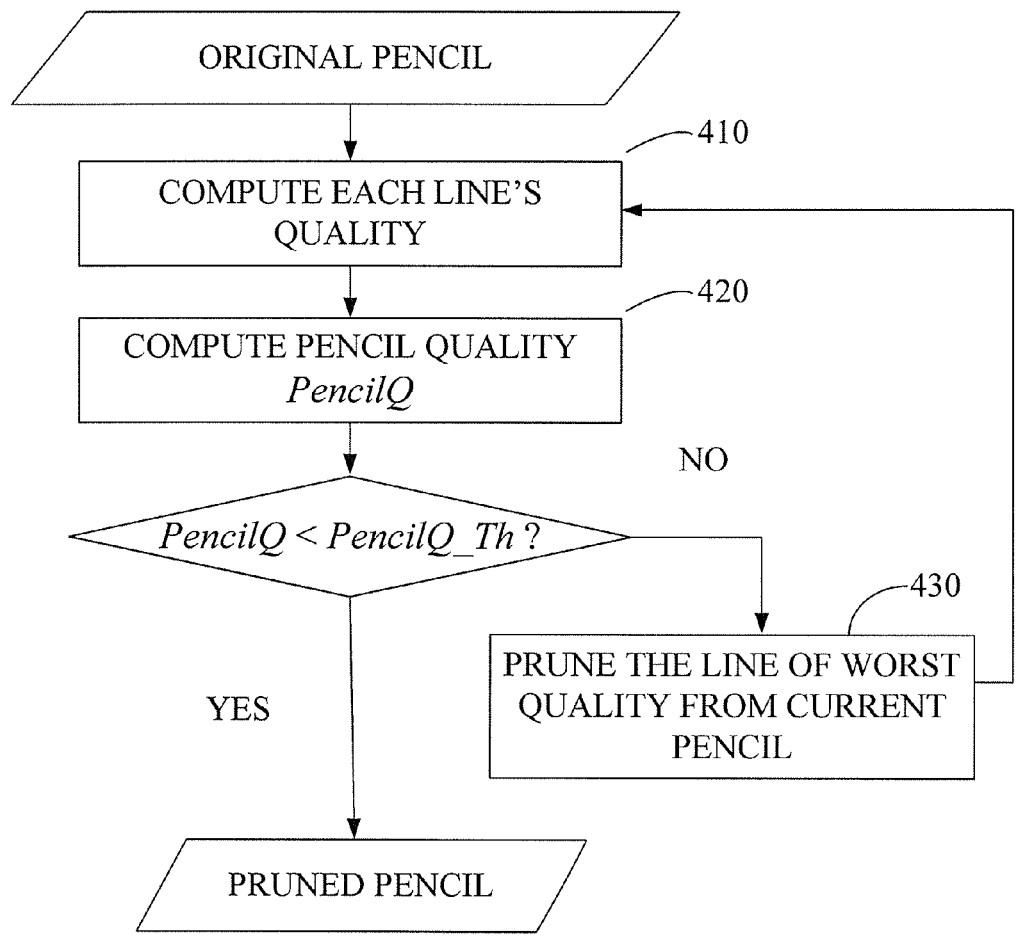
FIG. 6 is a flow chart illustrating the process of adaptive pencil pruning according to the first embodiment of the present invention.

The sub-procedures in Step 400 are illustrated in FIG. 6. FIG. 6 is a flow chart illustrating the process of adaptively pencil line pruning.

As shown in FIG. 6, first at step 410, each line's quality LineQ is computed.

Then, in step 420, each pencil's quality is computed by combing Equation (6) and Equation (7).

After computing each pencil's quality, the pencil's quality is compared with a pre-defined threshold, to judge if the pencil is of sufficiently high quality.

If the pencil's quality is larger than the threshold, the process advances to step 430, the pencil is pruned, and each line's quality is computed again. In step 430, since the pencil is not of sufficiently high quality, the pencil is pruned by deleting the worst line according to line's quality.

The above steps are repeated until the pencil quality is of sufficiently high quality, i.e., abnormal lines are all removed.

The results of adaptive pencil pruning are illustrated in FIGS. 7a-7d. FIG. 7a shows the original pencil for the non parallel situation, and FIG. 7b shows the pruned pencil with respect to the original pencil for the non parallel situation shown in FIG. 7a according to the first embodiment of the present invention. In addition, FIG. 7c shows the original pencil for the parallel situation, and FIG. 7d shows the pruned pencil with respect to the original pencil for the parallel situation shown in FIG. 7c according to the first embodiment of the present invention.

Now returning back to FIG. 2 again, after adaptively pruning the pencils, the process advances from step 400 to step 500. In step 500, the to vanishing point is computed with the following derived formula.

Each pencil corresponds to a vanishing point. However, there is still no reliable method to compute such vanishing point. The present invention hereby proposes a new method to compute the vanishing point by a new derived formula, and the details are explained as following.

If a pencil (a series of lines $(r_i, \theta_i)$ where $i \in [1, N]$) is obtained in a perspective distorted image, and it is supposed to have a vanishing point $(x_0, y_0)$. For any line $(r, \theta)$ passing $(x_0, y_0)$, the following equation (8) can be obtained:

$$r = x_0 \cos\theta + y_0 \sin\theta. \quad (8)$$

For any two lines $(r_i, \theta_i)$ and $(r_j, \theta_j)$ in this pencil, they and line $(r, \theta)$ must satisfy Equation (5).

An objective function E is defined as:

$$E = \sum_{i,j} (r\sin(\theta_i - \theta_j) + r_i \sin(\theta_j - \theta) + r_j \sin(\theta - \theta_i))^2, \quad (9)$$

and here, E can be seen as an overall measure of the quality of the fit of the vanishing point to the pencil. $E \geq 0$ (=0 only in ideal situation, saying, the pencil intersects exactly at one point), and E is minimum only if $(r, \theta)$ passes this pencil's supposed vanishing point. Based on this analysis, the following equation (10) can be derived:

$$\frac{\partial E}{\partial r} = 0, \quad (10)$$

if $(r, \theta)$ passes vanishing point.

Combing Equation (9) and Equation (10), equation (11) as follows can be obtained:

$$r = \frac{\sum_{i,j} \sin(\theta_i - \theta_j)[r_i \sin(\theta_j - \theta) + r_j \sin(\theta - \theta_i)]}{-\sum_{i,j} \sin^2(\theta_i - \theta_j)}. \quad (11)$$

By collating Equation (11) and Equation (8), the vanishing point $(x_0, y_0)$ can be estimated as:

$$\begin{bmatrix} x_0 \\ y_0 \end{bmatrix} = \frac{-1}{\sum_{i,j} \sin^2(\theta_i - \theta_j)} \begin{bmatrix} \sum_{i,j} \sin(\theta_i - \theta_j)(r_i \sin\theta_j - r_j \sin\theta_i) \\ \sum_{i,j} \sin(\theta_i - \theta_j)(r_j \cos\theta_i - r_i \cos\theta_j) \end{bmatrix}. \quad (12)$$

Equation (12) is the proposed vanishing point estimation method according to the present invention. FIGS. 8a-8d illustrate an example for vanishing point estimation in a texture document image, wherein FIG. 8a shows the original local horizontal pencil and FIG. 8b shows the original local vertical pencil, FIG. 8c shows the original image and FIG. 8d shows the image with vanishing points labeled.

Second Embodiment

As another embodiment of the present invention, vanishing points are located by analyzing edge information of characters, which is different from the above described first embodiment of the present invention. The main steps according to the method of the second embodiment of the present invention are shown in FIG. 9.

Figure 9:
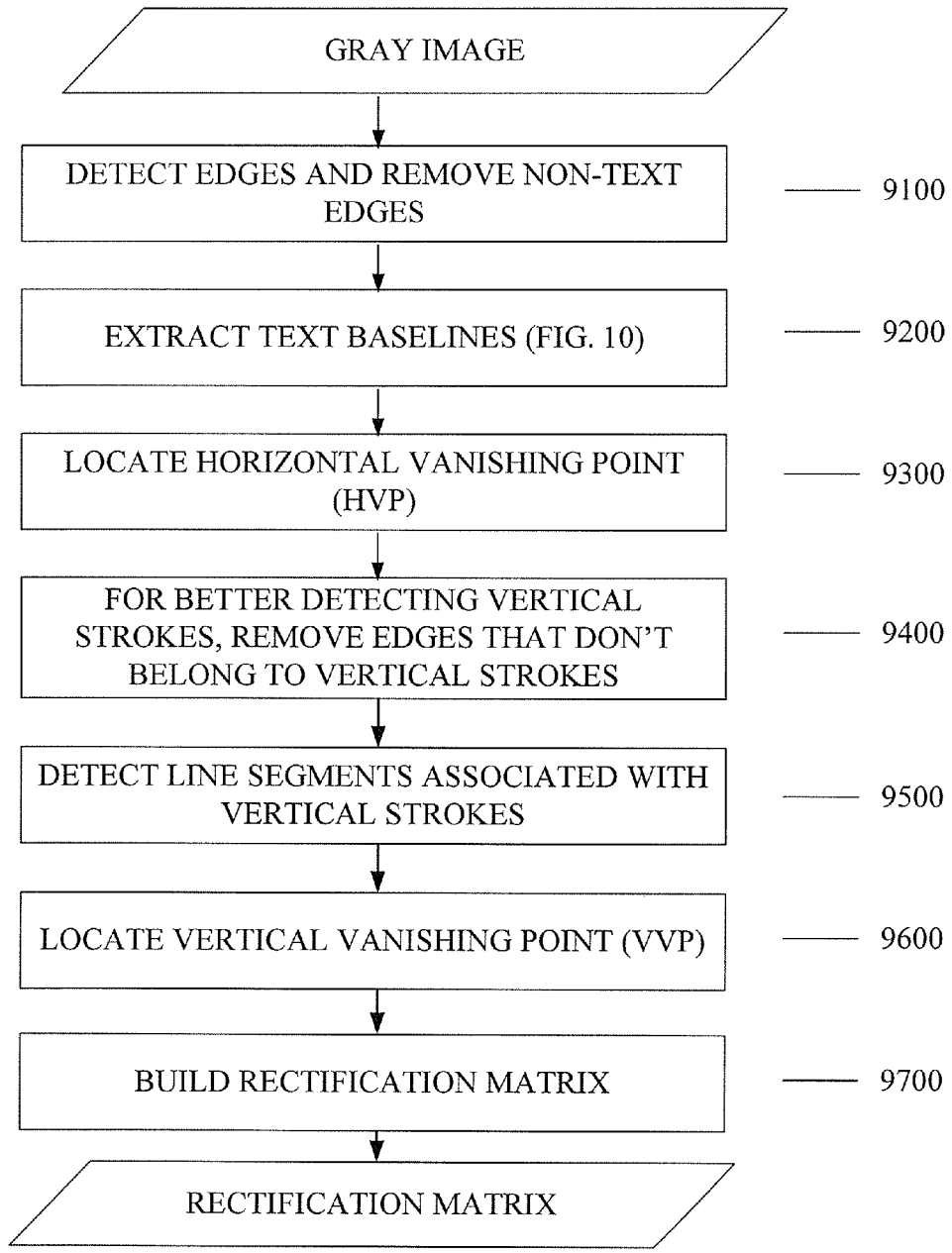
FIG. 9 shows the flow chart of the method for detecting the vanishing points from a document image according to the second embodiment of the present invention.

FIG. 9 shows the flow chart of the method for detecting the vanishing points from a document image according to the second embodiment of the present invention.

As shown in FIG. 9, first in step 9100, edges are detected and non-text edges are removed.

To facilitate edge detection, a color image and a BW image are first converted into their gray-scale representation. Then edges are detected with a Sobel edge detector followed by non-maximum suppression.

The sensitivity threshold (ST) for the Sobel edge detector is computed automatically from the histogram of gradient magnitudes by using Otsu's threshold method. The edge detector ignores all edges that are not stronger than the sensitivity threshold ST.

After edge detection, a connective components (CC) analysis is performed on the edge image to remove non-text edges. Connective components analysis is basically based on connective components' size and aspect ratio. If the size of a connective component is too large or too small, or the connective component has a large aspect ratio (in this case, it is possibly a line), the connective component is classified as a non-text connective component. And all edges that belong to the non-text connective component are removed from the edge image.

Then, in step 9200, the text baselines are extracted. Most of the edges in the edge image now belong to characters. The horizontal vanishing point (HVP) can be estimated based on the parallel lines extracted from the text alignment information, such as text baselines. In the present invention, text baselines are extracted by using the methods in shown FIG. 10.

While extracting text baselines, the process needs to obtain the major direction of the baseline image for later processing and HVP finding. This major direction is the rough text line orientation detected by the skew detection on the original gray scale image. The nearest neighbor based method, such as the method disclosed by C. R. Dance in "Perspective estimation for document images," Proceedings of the SPIE Conference on Document Recognition and Retrieval IX 2002; 244-254, is used to detect the rough skew angle of the document image. This angle is regarded as the text line orientation. A substituted method is used to generate several baseline images in different pre-given orientations, e.g. 0, −30, 30 and 90 degrees, and to choose the best one that has the best continuity and linearity.

After the skew detection, the edge image is rotated by the determined rough skew angle or a certain pre-given orientation in step 1001.

Figure 11:
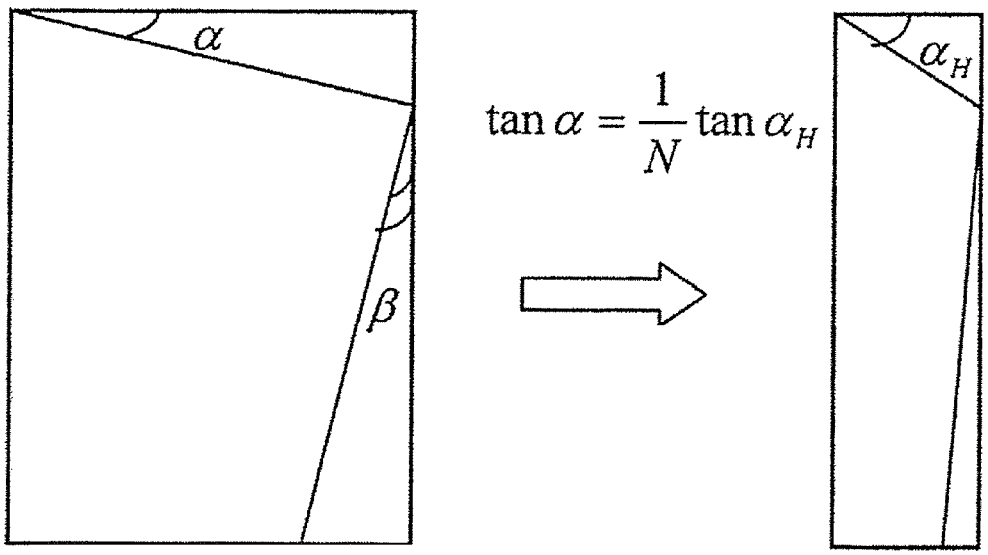
FIG. 11 shows the angle enlargement effect of horizontal compression.

Then in step 1002 the rotated image is compressed along the X-direction by the "OR" method. The compression ratio should be variable according to the character size or the image size. This kind of anisotropic "OR" compression could bring two benefits. First, close characters and close words will be connected into text lines, such as the X-compressed edge image shown in FIG. 12a. Second, the distortion or skewness will be enlarged. Thus it makes the distortion detection much easier, as shown in FIG. 11, which shows the angle enlargement effect of horizontal compression.

Figure 12:
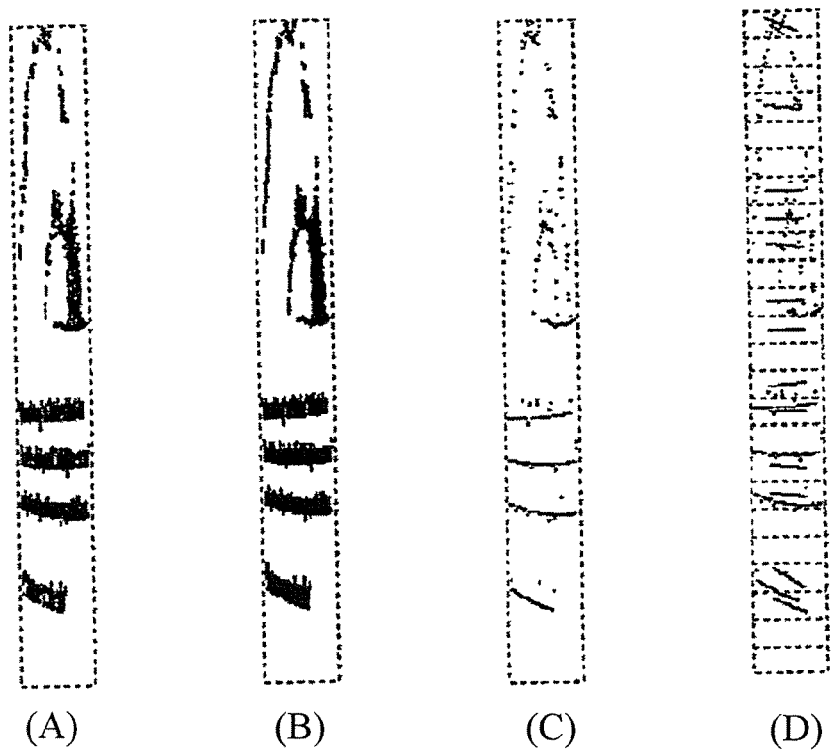
FIG. 12a shows the X-compressed edge image obtained by the method for extracting text baselines according to the second embodiment of the present invention.
FIG. 12b shows the text line image extracted by the method for extracting text baselines according to the second embodiment of the present invention.
FIG. 12c shows the baseline image extracted by the method for extracting text baselines according to the second embodiment of the present invention.
FIG. 12d shows sub images and their skews according to the second embodiment of the present invention.

In order to obtain more continuous baselines, the well-known RLSA (Run Length Smoothing Algorithm) operation is performed along the X direction on the compressed image to connect words into lines in step 1003. The threshold for a minimum run length is set as 4. And then in step 1004 spaces (small "holes") in and between characters (words) are filled by finding and analyzing white connected components. The result can be shown as in FIG. 12b, which shows the text line image. Thereafter, in step 1005, by retrieving the end point of black runs along the Y direction, the end points of black runs along the Y direction are extracted as baseline points, as shown in FIG. 12c which shows the baseline image.

Figure 10:
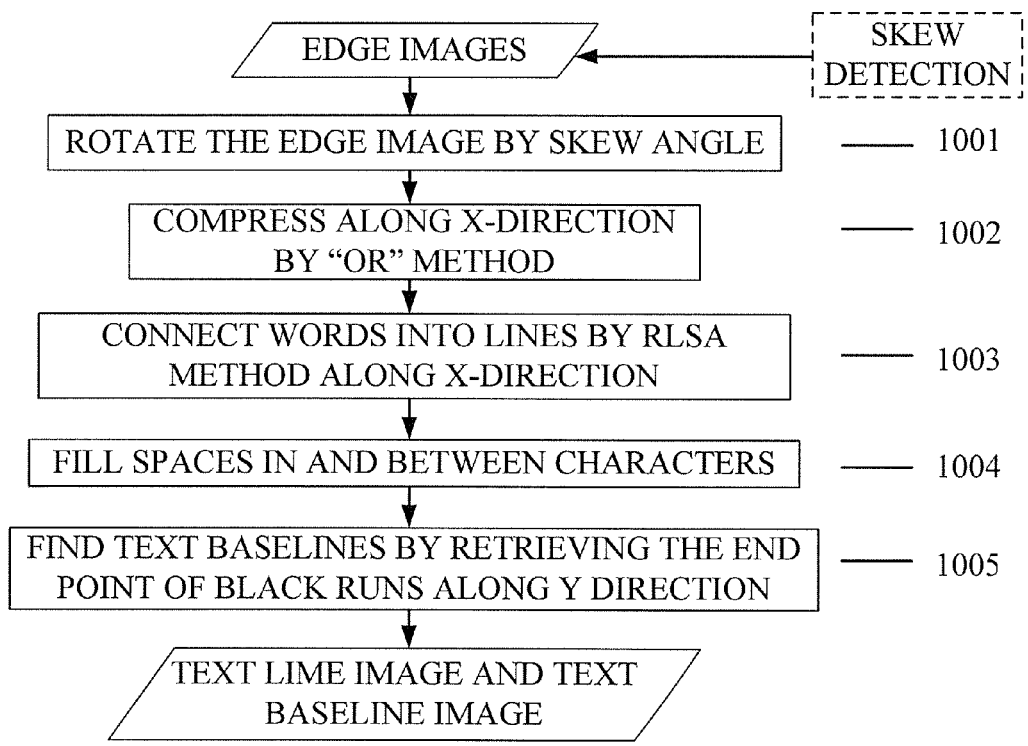
FIG. 10 shows the flow chart of the method for extracting text baselines according to the second embodiment of the present invention.

After extracting the text baselines according to the above described method as shown in FIG. 10, the process returns to step 9300 shown in FIG. 9.

In step 9300, the horizontal vanishing point is located. The process is performed by first locating the rough position of the HVP in step 9300-1 and then finding the accurate position of the HVP in the neighbor area of the rough HVP in step 9300-2, which will be detailed described in the following description.

First, in step 9300-1, the rough HVP is located.

After the baseline image is obtained, it is divided into M=2*N sub images. Here, M is an empirical value, and N is the compression ratio defined in step 9300. And for each sub image $I_i$, an average skew $\theta_i$ is determined, and the maximum premium $W_i$, which is defined as the square sum of projection profile, also is determined by the projection profile based method. Here, it is assumed that there only exists skew distortion in the sub images. The perspective distortion in these sub images is so small that it can be ignored. FIG. 12d shows the sub images and their skews.

Figure 13:
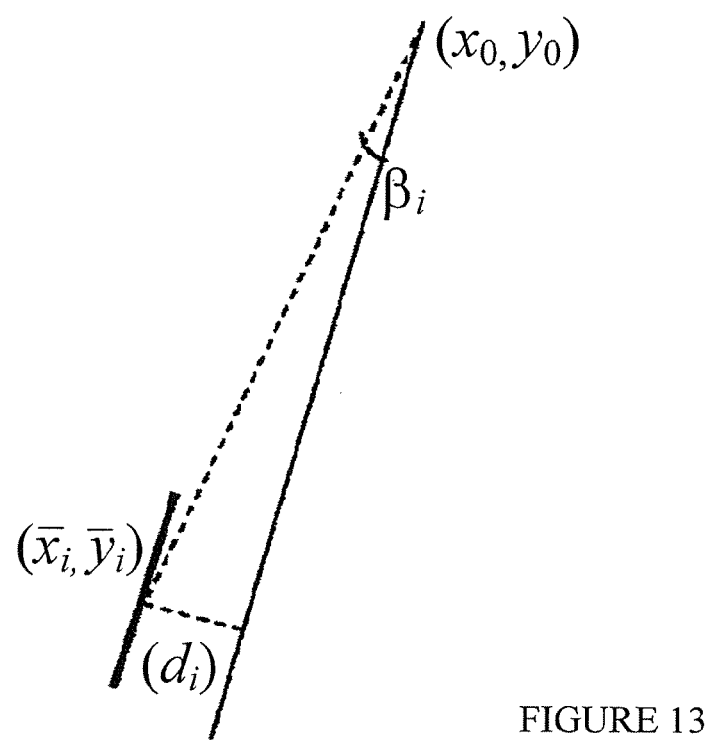
FIG. 13 shows the cross angle between the line drawn from a sub image of FIG. 12d and the line that passes through the rough location of horizontal vanishing point and the center of the sub image according to the second embodiment of the present invention.

Then the rough location of the HVP is calculated according to those multiple skews of sub images. A line can be drawn from the center $(\bar{x}_i, \bar{y}_i)$ of each sub image, with the angle $\theta_i$ and the weight $W_i$. Given the set of lines L≡{$L_i$, i=0, . . . , M−1}, recursively group two lines, one obtains the intersection point $(x_0, y_0)$, and calculates a value for the following function:

$$f(x_0, y_0) = \sum_{i=0}^{L-1} (W_i \mid \beta_i < \Delta\beta)$$

where, $\beta_i$ (as shown in FIG. 13 which illustrates the $\beta_i$) is the cross angle between line $L_i$ and the line that passes through $(x_0, y_0)$ and $(\bar{x}_i, \bar{y}_i)$, and $\Delta\beta$ defines a small range tolerance on the cross angle. $f(x_0, y_0)$ indicates how many weighted lines pass through $(x_0, y_0)$, and the $(x_0, y_0)$ producing the maximum $f(x_0, y_0)$ is chosen as the rough location of horizontal vanishing point.

Then, in step 9300-2, the accurate HVP is located.

In the end, another approach based on projection profiles of the baseline image is used to find the accurate HVP. The combination of these two approaches allows the HVP location to be found with lower computation costs and higher accuracy.

Figure 14:
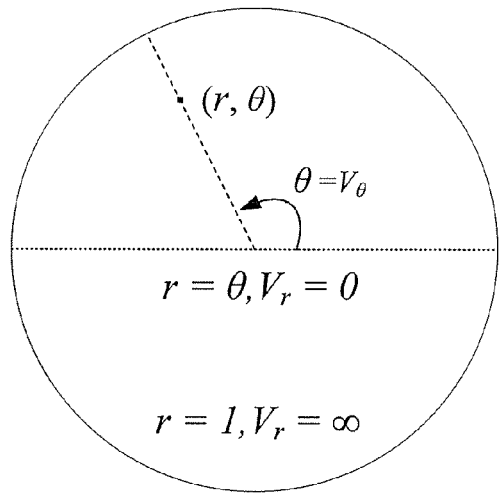
FIG. 14 shows the relationship between search space C and $R^2$ according to the second embodiment of the present invention.

A circular search space C as illustrated in FIG. 14 is used. FIG. 14 shows the relationship between search space C and $R^2$. Each cell $c=(r, \theta)$, $0 \leq r < 1$ and $0 \leq \theta < 360°$ in the space C corresponds to a hypothesized horizontal vanishing point $V=(V_r, V_\theta)$ on the image plane $R^2$, with distance $V_r = R_0[r/(1−r)]$ from the center of the image, and angle $V_\theta = \theta$. $R_0$ is the radius of image. This maps the infinite plane $R^2$ exponentially into the finite search space C. A projection profile is generated for each hypothesized HVP in C, except for those lying within the image region itself. And a projection profile η is a set of bins {$\eta_i$, i=0, 1, 2, . . . }.

In perspective transformation, all points on the image plane which have the same angle connecting to the horizontal vanishing point must be on the same horizontal line of a real scene. So pixels with different angles are projected to different bins in the projection profile.

Compare the projection profiles mapped from each hypothesized HVP, and pick out the most qualified projection profile. Its corresponding HVP is the required point.

Here, the search space is smaller than C because the rough HVP has been found. Its angle range is set as ±4° and distance range is only about one fifth of the whole distance range.

A simple hierarchical approach is used for the search process. An initial 2-dimension scan of the search space at a low resolution is performed and one winning HVP, which has the maximum square sum of projection profile, is picked out. Then, on the region around the winning HVP, a full resolution 2-dimension scan is performed and the accurate HVP is found in the end.

For low resolution, the angle space is 0.5 degree and the distance range is divided into 8 equal parts. For full resolution, the angle space and distance space is one sixth of that in low resolution scan.

In the initial scan step, if the distance of the rough HVP is large enough, the symmetrical angle of the rough HVP may be also considered.

Because of different compression ratios in the X-direction and the Y-direction, two dimensions in the X-baseline images are not isotropic. To keep the scan uniform, it needs to generate a hypothesized HVP in the search space of the original image.

Figure 15:
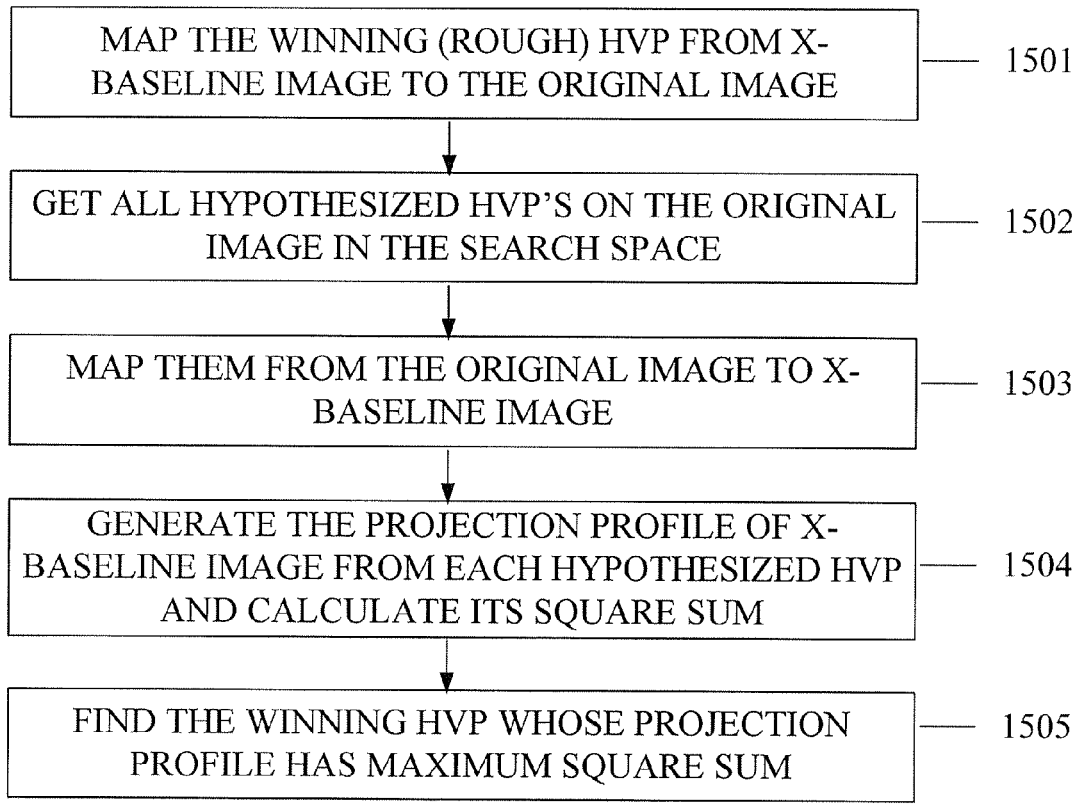
FIG. 15 shows the scan process in the search space according to the second embodiment of the present invention.

Each scan flows as in FIG. 15. FIG. 15 shows the scan process in the search space.

As shown in FIG. 15, at first in step 1501, the winning (rough) HVP is mapped from the X-baseline image to the original image.

Then, in step 1502, all the hypothesized HVPs on the original image are obtained in the search space, and are mapped from the original image to the X-baseline image in step 1503.

Next, in step 1504, the projection profile of the X-baseline image is generated from each hypothesized HVP and its square sum is calculated. Finally in step 1505, the winning HVP whose projection profile has the maximum square sum is found and determined as the accurate HVP.

In the analysis of the projection profile, according to its peaks and valleys, the projection profile is divided into text lines (i.e., projection profile segments). Then these segments are checked, and the square sums of all valid segments are accumulated and the result is regarded as the square sum of the whole projection profile.

Figure 16:
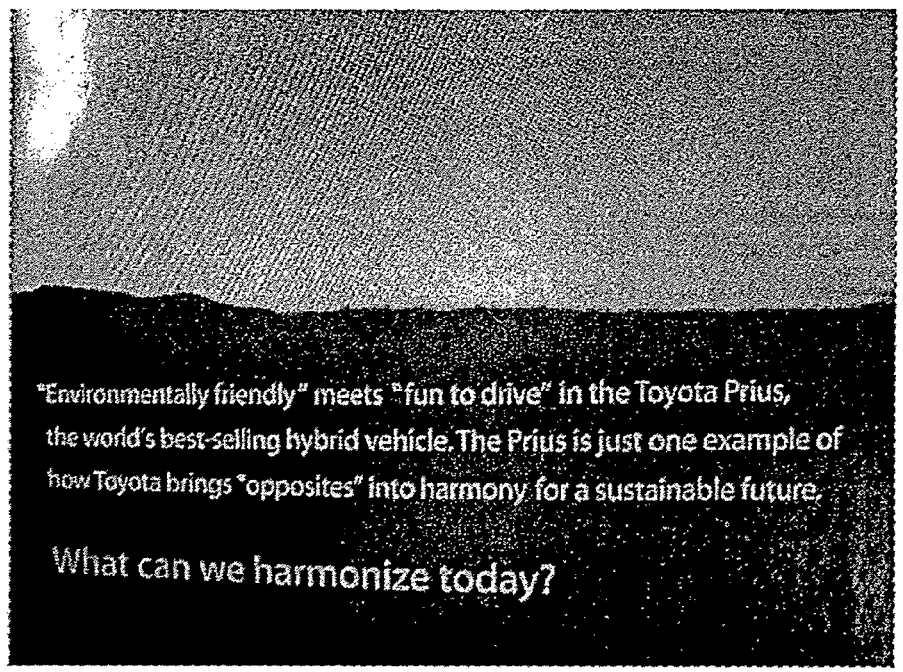
FIG. 16 shows an original perspective distorted image.
Figure 17:
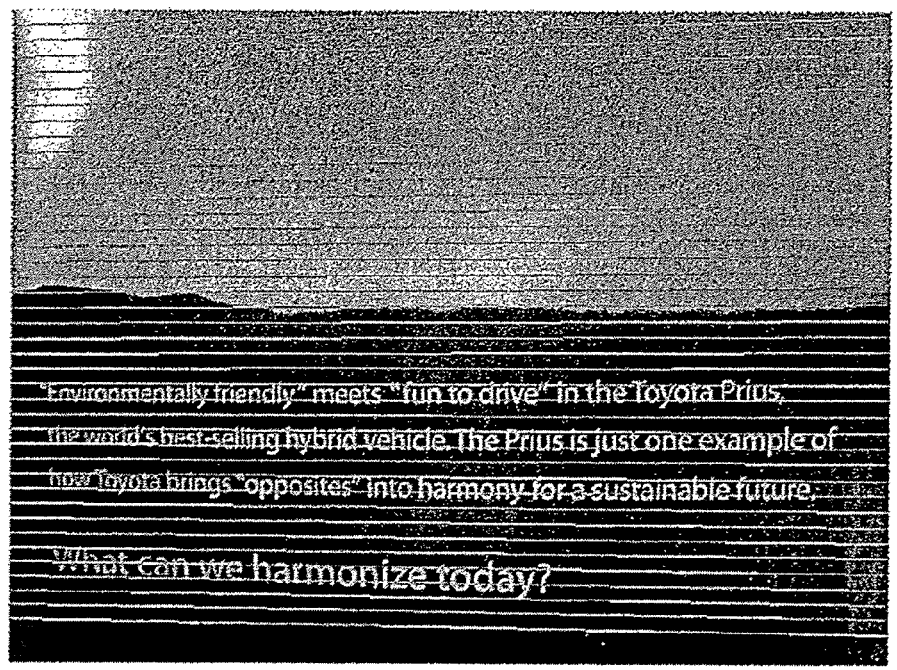
FIG. 17 illustrates the result of HVP according to the second embodiment of the present invention.

An original perspective distorted image is shown in FIG. 16, and FIG. 17 illustrates the result of HVP. All the horizontal lines are derived from the same point, i.e., the HVP. Lots of evaluations on various kinds of document images show that the method proposed in the present invention is of high accuracy. And it takes less than several hundreds of milliseconds to perform the method on one image.

Now returning back to FIG. 9, after locating the horizontal vanishing point (HVP) as explained in the above description, the process advances to step 9400, in which edges that don't belong to vertical strokes are removed so as to detect the vertical strokes better.

Edges which do not belong to vertical strokes are then removed by comparing the gradient direction and the HVP line direction. The HVP line is the line which passes through the current edge and the HVP. For each edge $i(x_i, y_i)$, the the gradient direction is computed by:

$$\tan\theta_i = \frac{Gy_i}{Gx_i}$$

where, $Gx_i$ and $Gy_i$ are the gradient along the X direction and the Y direction, respectively.

The HVP line direction is computed by:

$$\tan\beta_i = \frac{vy - y_i}{vx - x_i}$$

where, (vx, vy) are the coordinates of the HVP. If the cross angle of the two lines, $\Delta\theta_i = |\theta_i - \beta_i|$ is greater than a given threshold $\Delta\theta$, the edge is removed from the edge image. This is equivalent to comparing $|\tan \Delta\theta_i|$ and $|\tan \Delta\theta|$. $|\tan \Delta\theta_i|$ is computed as:

$$|\tan\Delta\theta_i| = |\tan(\theta_i - \beta_i)| = \left|\frac{\tan\theta_i - \tan\beta_i}{1 + \tan\theta_i\tan\beta_i}\right|.$$

After removing the edges that do not belong to the vertical strokes in step 9400, the process advances to step 9500, in which the line segments associated with vertical strokes are detected.

The vertical stroke candidates are found by finding connective components on the processed edge image. For the purpose of calculation of the vanishing point, only dominant connective components, whose length is in a certain range (12<L<150), are considered.

The line segments associated with vertical strokes are obtained by fitting a line parameterized by an angle $\theta$ and the distance from image origin $\rho$:

$$\rho = x \cos\theta + y \sin\theta.$$

Each obtained connective component is a list of edge pixels $(x_i, y_i)$ with a similar gradient orientation. The line parameters are directly determined from the eigenvalues $\lambda_1$ and $\lambda_2$ and eigenvectors $v_1$ and $v_2$ of the matrix D associated with the edge pixels.

$$D = \begin{bmatrix} \sum_i \tilde{x}_i^2 & \sum_i \tilde{x}_i \tilde{y}_i \\ \sum_i \tilde{x}_i \tilde{y}_i & \sum_i \tilde{y}_i^2 \end{bmatrix}$$

where $\tilde{x}_i = x_i - \bar{x}$ and $\tilde{y}_i = y_i - \bar{y}$ are the mean corrected pixels coordinates belonging to a particular connective component and $$\bar{x} = \frac{1}{n}\sum_i x_i \text{ and } \bar{y} = \frac{1}{n}\sum_i y_i.$$

In the case of an ideal line, one of the eigenvalues should be zero.

The quality of the line fit is characterized by the ratio of the two eigenvalues of matrix D, $$v = \frac{\lambda_1}{\lambda_2}.$$

The line parameters are determined from the eigenvectors $v_1$, $v_2$, where $v_1$ is the eigenvector associated with the largest eigenvalue. The parameters of the line $\rho = x \cos\theta + y\sin\theta$ are then computed as:

$$\theta = a\tan\left(\frac{v_1(2)}{v_1(1)}\right)$$

$$\rho = \bar{x}\cos\theta + \bar{y}\sin\theta$$

where $(\bar{x}, \bar{y})$ is the mid-point of the line segment.

After detecting the segments associated with the vertical strokes in step 9500, the process advances to step 9600, in which the vertical vanishing points (VVP) is located.

Figures 18, 19:
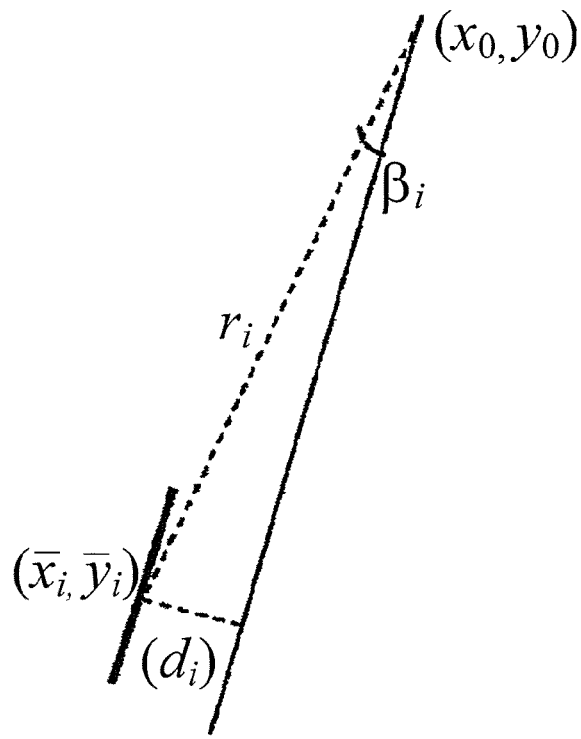

The line detection stage in step 9500 produces a set of line segments $L \equiv \{L_l, l=0, \ldots, L-1\}$. The purpose of this step is to locate the most optimal convergent point, namely VVP, from the detected line segments. A statistical approach is used to search for the VVP. The approach consists in a minimization of the following function:

$$\min_{x_0, y_0} = \sum_i W_i(\sin\beta_i)^2, \text{ where}$$

$$W_i = \frac{v_i}{V},$$

$$\sin\beta_i = \frac{d_i}{r_i},$$

$$d_i = |\rho_i - x_0\cos\theta_i - y_0\sin\theta_i|, \text{ and}$$

$$r_i = \sqrt{(x_0 - \bar{x}_i)^2 + (y_0 - \bar{y}_i)^2},$$

and where, $v_i$ is the length of the $i^{th}$ line segment, while V is the total length of all line segments, $(\bar{x}_i, \bar{y}_i)$ is the mid-point of the line segment, $d_i$ is the distance of the vanishing point $(x_0, y_0)$ from the line segment i, and $r_i$ is the distance of the vanishing point and the line segment center. FIG. 18 shows the relationship of the above mentioned parameters.

Here, the method does not try to search for the accurate vertical vanishing point $(x_0, y_0)$ in the whole image plane, but in the collections of all intersection points of the line segments, which will greatly reduce the computation load. However, if the number of line segments is great (>1000), searching in all intersection points is still time-consuming. Thus, the following method is used to reduce the number of intersection points to be searched.

Step 9601: Project $(\bar{x}_i, \bar{y}_i)$, the coordinates of line segment centers onto the line L which passes through the image center and the horizontal vanishing point (HVP).

Step 9602: Select the 25% most left line segments into Group 1. Select the 25% most right line segments into Group 2.

Step 9603: Select 100 longest line segments from Group 1 and select 100 longest line segments from Group 2.

Step 9604: Search in the intersection points of the selected line segments chosen in step 9603.

After locating the horizontal vanishing point in step 9300 and locating the vertical vanishing point in step 9600, the rectification matrix is built in step 9700. A 3*3 rectification matrix can be derived from the HVP and the VVP, according to the well-known geometry of rectification.

Figure 22:
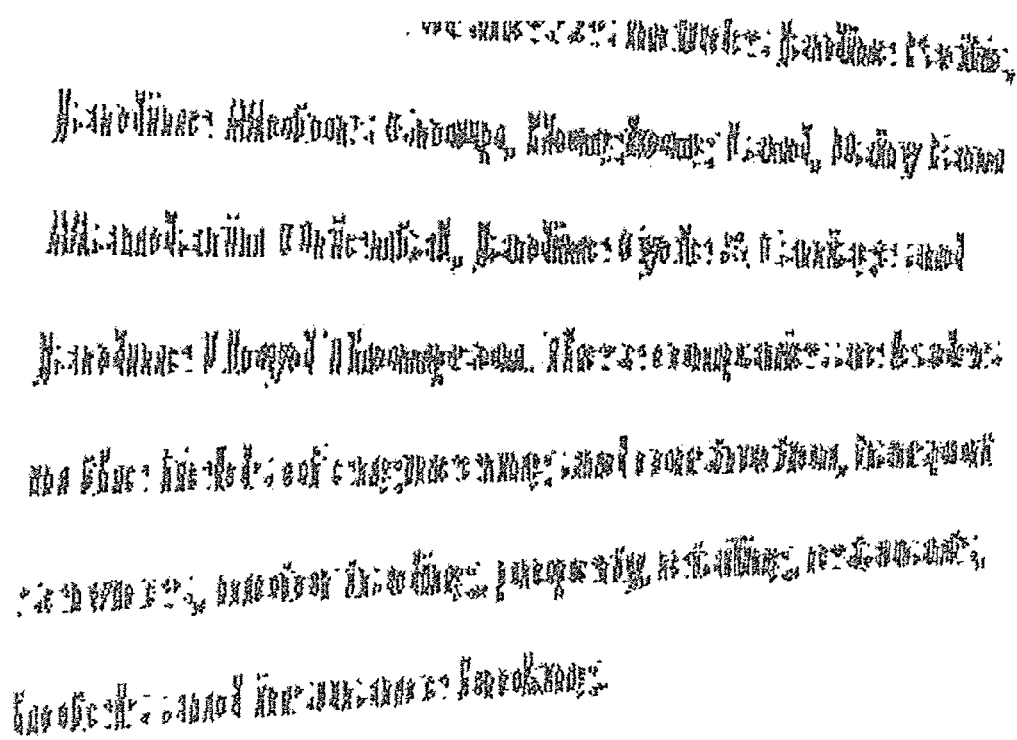
Figures 25, 26:
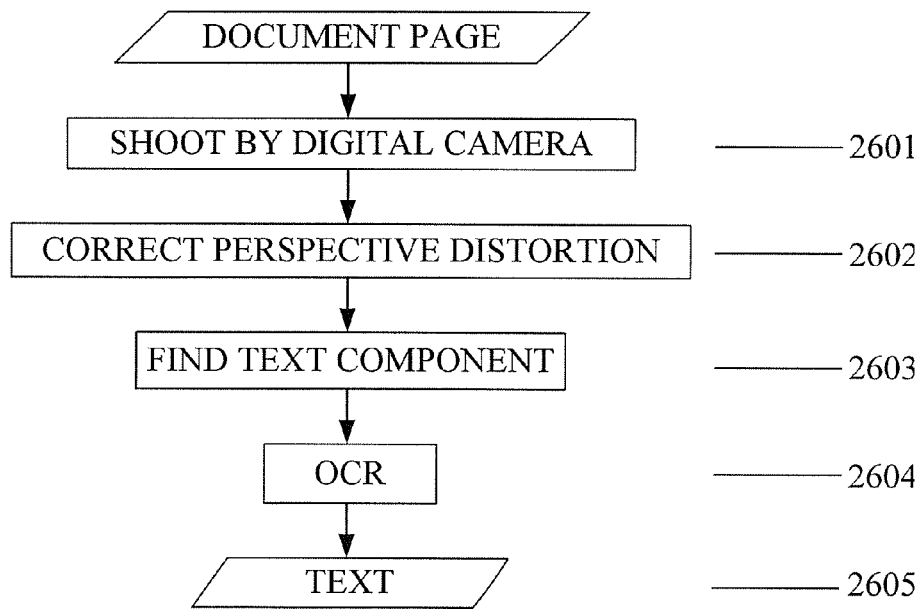

FIG. 19 to FIG. 25 give the results of perspective rectification by applying the proposed method according to the second embodiment, wherein FIG. 19 shows a perspective distorted image, FIG. 20 illustrates the detected horizontal vanishing point HVP and all the horizontal lines are derived from the same point, i.e., the HVP, FIG. 21 shows an image block cropped from the edge image before removing edges that do not belong to the vertical strokes, FIG. 22 shows an image block cropped from the edge image after removing the edges that do not belong to the vertical strokes, FIG. 23 shows the detected line segments (vertical strokes), FIG. 24 illustrates the detected horizontal vanishing point HVP and the vertical vanishing point VVP and all the horizontal lines are derived from the HVP and all the vertical lines are derived from the VVP, and FIG. 25 shows the perspective rectified image according to the second embodiment of the present invention.

The above described method for detecting the vanishing points from a document image according to the first and second embodiment of the present invention can be used in a document entry system based on digital cameras, such as illustrated in FIG. 26.

FIG. 26 shows a document entry system based on a digital camera that the method for detecting the vanishing points from a document image according to the first and second embodiments of the present invention can be applied.

As shown in FIG. 26, in step 2601 the document page is shot by a digital camera. Then, in step 2602, the perspective distortion contained in the document page shot by the digital camera is corrected by the above described method for detecting the vanishing points from a document image according to the first and second embodiment of the present invention.

Next, in step 2603 the text component can be found in the document page with perspective distortion being corrected. After performing optical character recognition in step 2604, the text in the original document page can be output in step 2605.

Besides the above mentioned concrete embodiments of the present invention's method and apparatus, the objects of the invention may also be realized through running a program or a set of programs on any information processing equipment as described above, which may be communicated with any subsequent processing apparatus. The information processing equipment and subsequent processing apparatus may be all universally well-known equipment.

Therefore, it is important to note that the present invention includes a case wherein the invention is achieved by directly or remotely supplying a program (a program corresponding to the illustrated flow chart in the embodiment) of software that implements the functions of the aforementioned embodiments to a system or apparatus, and reading out and executing the supplied program code by a computer of that system or apparatus. In such case, the form is not limited to a program as long as the program function can be provided.

Therefore, the program code itself installed in a computer to implement the functional process of the present invention using computer implements the present invention. That is, the present invention includes the computer program itself for implementing the functional process of the present invention.

In this case, the form of program is not particularly limited, and an object code, a program to be executed by an interpreter, script data to be supplied to an OS, and the like may be used as along as they have the program function.

As a recording medium for supplying the program, for example, a floppy disk, a hard disk, an optical disk, a magneto optical disk, a MO, CD-ROM, a CD-R, a CD-RW, a magnetic tape, a nonvolatile memory card, ROM, a DVD (DVD-ROM, DVD-R), and the like may be used.

As another program supply method, a connection may be established to a given home page on the Internet using a browser on a client computer, and the computer program itself of the present invention or a file, which is compressed and includes an automatic installation function, may be downloaded from that home page to a recording medium such as a hard disk or the like, thus supplying the program. Also, program codes that form the program of the present invention may be broken up into a plurality of files, and these files may be downloaded from different home pages. That is, the present invention also includes a WNW server that makes a plurality of users download program files for implementing the functional process of the present invention using a computer.

Also, a storage medium such as a CD-ROM or the like, which stores the encrypted program of the present invention, may be delivered to the user, the user who has cleared a predetermined condition may be allowed to download key information that decrypts the program from a home page via the Internet, and the encrypted program may be executed using that key information to be installed on a computer, thus implementing the present invention.

The functions of the aforementioned embodiments may be implemented not only by executing the readout program code by the computer but also by some or all of actual processing operations executed by an OS or the like running on the computer on the basis of an instruction of that program.

Furthermore, the functions of the aforementioned embodiments may be implemented by some or all of actual processes executed by a CPU or the like arranged in a function extension board or a function extension unit, which is inserted in or connected to the computer, after the program read out from the recording medium is written in a memory of the extension board or unit.

What has been describes herein is merely illustrative of the application of the principles of the present invention. For example, the functions described above as implemented as the best mode for operating the present invention are for illustration purposes only. As a particular example, for instance, other design may be used for obtaining and analyzing waveform data to determine speech. Also, the present invention may be used for other purposes besides detecting speech. Accordingly, other arrangements and methods may be implemented by those skilled in the art without departing from the scope and sprit of this invention.

What is claimed is:

1. A method for detecting at least one vanishing point from an image, the method comprising the following steps performed by at least one processor:
    a dividing step for dividing the image into a plurality of patches;
    a first detecting step for detecting each patch's local orientations;
    a composing step for composing lines of pencils from which at least one vanishing point is to be computed based on the local orientations detected in said first detecting step; and
    a first computing step for computing at least one vanishing point based on the lines of pencils composed in said composing step.

2. A method according to claim 1, further comprising a first pruning step for pruning a noisy line from the lines of pencils composed in said composing step, and wherein, in said first computing step, the vanishing point is computed based on the lines of pencils after the noisy line was pruned in said first pruning step.

3. A method according to claim 1, wherein the local orientations are detected based on local spectra analysis of the patches in said first detecting step.

4. A method according to claim 3, wherein said first detecting step comprises:
    a preprocessing step for preprocessing the patches with a spectra filter;
    a second computing step for computing the patch's spectra by processing the preprocessed patches with FFT;
    a second pruning step for adaptively pruning the patch's spectra obtained in said second computing step; and
    an estimating step for estimating the local orientations by independent component analysis of the spectra.

5. A method according to claim 4, wherein the spectra filter used in said preprocessing step is a Hanning filter.

6. A method according to claim 4, wherein, in said second pruning step, the spectra are pruned by deleting the directed current component and reserving the first "n" largest spectra component, wherein the "n" equals a template size.

7. An apparatus for detecting at least one vanishing point from an image, the apparatus comprising at least one processor which executes a program stored in a memory, wherein the at least one processor comprises:
    a dividing unit configured to divide the image into a plurality of patches;
    a first detecting unit configured to detect each patch's local orientations;
    a composing unit configured to compose lines of pencils from which at least one vanishing point is to be computed based on the local orientations detected by said first detecting unit; and
    a first computing unit configured to compute at least one vanishing point based on the lines of pencils composed by said composing unit.

8. A non-transitory computer-readable storage medium storing a computer program, wherein the computer program enables a computer to execute:
    a dividing step for dividing the image into a plurality of patches;
    a first detecting step for detecting each patch's local orientations;
    a composing step for composing lines of pencils from which at least one vanishing point is to be computed based on the local orientations detected in said first detecting step; and
    a first computing step for computing at least one vanishing point based on the lines of pencils composed in said composing step.

* * * * *